United States Patent
Fan et al.

(10) Patent No.: US 10,551,941 B2
(45) Date of Patent: Feb. 4, 2020

(54) QUICK BROWSING OF DISPLAYED CONTENT

(71) Applicant: INTERNATIONAL BUSINESS MACHINES CORPORATION, Armonk, NY (US)

(72) Inventors: Si Bin Fan, Beijing (CN); Ping Xiao, Beijing (CN); Jun Zhang, Beijing (CN); XiaoLin Zhang, Beijing (CN); Jia Zou, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/009,645

(22) Filed: Jun. 15, 2018

(65) Prior Publication Data

US 2018/0292921 A1     Oct. 11, 2018

Related U.S. Application Data

(63) Continuation of application No. 14/807,282, filed on Jul. 23, 2015, now Pat. No. 10,025,396.

(51) Int. Cl.
| | |
|---|---|
| *G06F 3/0354* | (2013.01) |
| *G06F 3/0482* | (2013.01) |
| *G06F 3/0485* | (2013.01) |
| *H04L 12/58* | (2006.01) |
| *H04W 4/12* | (2009.01) |
| *G09G 5/34* | (2006.01) |

(52) U.S. Cl.
CPC ........ *G06F 3/03543* (2013.01); *G06F 3/0482* (2013.01); *G06F 3/0485* (2013.01); *H04L 51/04* (2013.01); *H04W 4/12* (2013.01); *G09G 5/34* (2013.01); *G09G 2340/145* (2013.01)

(58) Field of Classification Search
CPC ............. G06F 17/30719; G06F 3/0482; G06F 3/0488; G06F 3/04847; G06F 3/04855
See application file for complete search history.

(56) References Cited

U.S. PATENT DOCUMENTS

| | | |
|---|---|---|
| 6,339,437 B1 | 1/2002 | Nielsen |
| 8,381,121 B2 | 2/2013 | Gupta et al. |

(Continued)

FOREIGN PATENT DOCUMENTS

| | | |
|---|---|---|
| CN | 101977233 A | 2/2011 |
| WO | 2001084368 A2 | 11/2001 |

OTHER PUBLICATIONS

IBM: List of IBM Patents or Patent Applications Treated as Related (Appendix P), Jun. 15, 2018, pp. 1-2.

(Continued)

*Primary Examiner* — Xiao M Wu
*Assistant Examiner* — Scott E Sonners
(74) *Attorney, Agent, or Firm* — Anthony M. Pallone

(57) ABSTRACT

In an approach to quick browsing of content displayed on a computing device, a computer monitors a scrolling operation in a first display mode on a computing device in which a plurality of information items are displayed. The computer determines whether a speed of the scrolling operation exceeds a threshold value, and then in response to the speed of the scrolling operation exceeding a threshold value, switches the first display mode to a second display mode.

14 Claims, 5 Drawing Sheets

(56) References Cited

U.S. PATENT DOCUMENTS

| | | | |
|---|---|---|---|
| 9,030,419 B1* | 5/2015 | Freed | G06F 3/0416 345/173 |
| 2008/0148193 A1 | 6/2008 | Moetteli | |
| 2008/0155475 A1* | 6/2008 | Duhig | G06F 3/0482 715/830 |
| 2009/0064031 A1* | 3/2009 | Bull | G06F 3/0485 715/784 |
| 2012/0062604 A1 | 3/2012 | Lobo et al. | |
| 2014/0292760 A1 | 10/2014 | Shikolay | |
| 2017/0025096 A1 | 1/2017 | Fan et al. | |

OTHER PUBLICATIONS

Buyukkokten et al., "Efficient Web Browsing on Handheld Devices Using Page and Form Summarization", ACM Transactions on Information Systems, vol. 20, No. 1, Jan. 2002, pp. 82-115, <http://dl.acm.org/citation.cfm?id=503109>.

Buyukkokten et al., "Power Browser: Efficient Web Browsing for PDA's", CHI 2000, The Hague, Amsterdam, Copyright ACM 2000, vol. 2, Issue 1, pp. 430-437, <http://dl.acm.org/citation.cfm?id=332470>.

* cited by examiner

QUICK BROWSING OF DISPLAYED CONTENT

BACKGROUND

The present invention relates to a field of computer user interface, and more specifically, to quick browsing of content displayed on a computing device.

Nowadays, the use of social network applications on a mobile device is increasingly popular. In the current social network applications, received information is displayed as a plurality of information items such as friend's updates, news from concerned areas, photographs, advertisements, web links, etc. Typically, these information items are displayed vertically in sequence from newer items, i.e., recently posted to the social network application, to older items with the newest item displayed on the top. When a user scrolls the screen upwards, the top information item will leave the screen from the top, and the next non-displayed information item will appear at the bottom of the screen. If the user continues to scroll the screen upwards, this process will go on as if all of the information items are in a queue, which is called seamless loading.

With the use of a social network application day by day, a user's social circle is growing with more friends and more areas or topics of concern, e.g., local news or organizations of interest. When the social circle of a user of the social network application increases the information pushed to his/her social network application every day, including friends' updates and also news of areas of concern, also increases. The user may feel overwhelmed by the tremendous amount of information since there are too many new information items each day and it may take the user a lot of time to browse all of them. However, if the user does not browse all of the recent information items, he/she may miss some important friends' updates or important news from his/her most concerned areas. Sometimes, the user does not want to see details of each new information item. Some information items are very long and take more than one screen size of the mobile device, and these information items may not be what the user is really interested in, which can make the user feel impatient.

One prior art discloses a method and system for leading a mobile terminal to browse a webpage in a reading mode. The solution in this publication provides a reading mode when browsing a webpage on mobile terminal. When a user accesses a webpage, a browsing server will filter unnecessary and invalid information, which includes advertisement, flash, and etc. Only valid information like text information is left on the webpage. This solution aims to remove browsing noises such as flashes, pictures and advertisements. Only text information is left for the user to browse.

SUMMARY

Considering the above problem, the inventors of the present invention propose a method, a system, and a computer program product for quick browsing of content displayed on a computing device without missing important information.

According to an embodiment of the present invention, there is provided a computer-implemented method for quick browsing of content displayed on a computing device. The method may include displaying, by the computing device, a first set of ordered information items from a list of ordered information items. Display of the first set of ordered information items is via a first display mode. The method may include monitoring, by the computing device, a scrolling speed of a scrolling operation on the computing device. The scrolling operation is performed within the first display mode. The method may include determining, by the computing device, between the first display mode and a second display mode, based on the scrolling speed of the scrolling operation exceeding a scrolling speed threshold. In response to the scrolling speed of the scrolling operation exceeding the scrolling speed threshold, the method may include displaying, by the computing device, the second display mode in front of the first display mode in an overlay manner. The second display mode displays, in a condensed format, a second set of ordered information items. The second set of ordered information items comprises the first set of ordered information items plus at least one additional information item from the list of ordered information items.

An advantage of the method allows a user to quickly scroll through content provided in a social network application, while not missing any information item due to the speed at which the user is scrolling through the content.

In an embodiment of the present invention, in response to the speed of the scrolling operation falling below the threshold value, the method includes switching the second display mode back to the first display mode. An advantage of this provides the user with the ability to view content in the social network application in detail when the user's speed of scrolling decreases, so that the user can review important information in the content.

In an embodiment of the present invention, in the second display mode, at least one of the plurality of information items is collapsed as a summary information item, with a length of characters less than a length of characters displayed in the first display mode. An advantage of this allows the user to view content in a summarized format while quickly scrolling through the social network application, so the user does not miss content.

In an embodiment of the present invention, in the second display mode, one or more summary information items are displayed in a floating window and the plurality of information items are displayed under the floating window. An advantage of this allows the user to view the summarized content while the detail content is shown behind the summarized content, allowing the user to stop scrolling if something of interest is viewed.

In an embodiment of the present invention, in the second display mode, the one or more summary information items are displayed in place of the plurality of information items. This is advantageous as it allows the user to quickly view content in a summary manner, for example, when there is limited amount of time to view the social network application.

In an embodiment of the present invention, in the second display mode, the plurality of information items are displayed with a bigger font size than a font size of the plurality of information items in the first display mode. This allows a user to quickly read content that may get missed if smaller font is displayed while quickly scrolling through the content provided in the social network application.

In an embodiment of the present invention, a direction of the scrolling operation is one of a vertical direction and a horizontal direction of a screen, and the scrolling operation is one of a sliding touch on the screen, a mouse wheel scrolling, and scrolling of a scroll bar. The advantage of this is that it allows operation of the invention on any device a user may use, and using any settings a user may desire.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the understanding of the present disclosure, and conveying the scope of the present disclosure to those skilled in the art.

Figure 1:
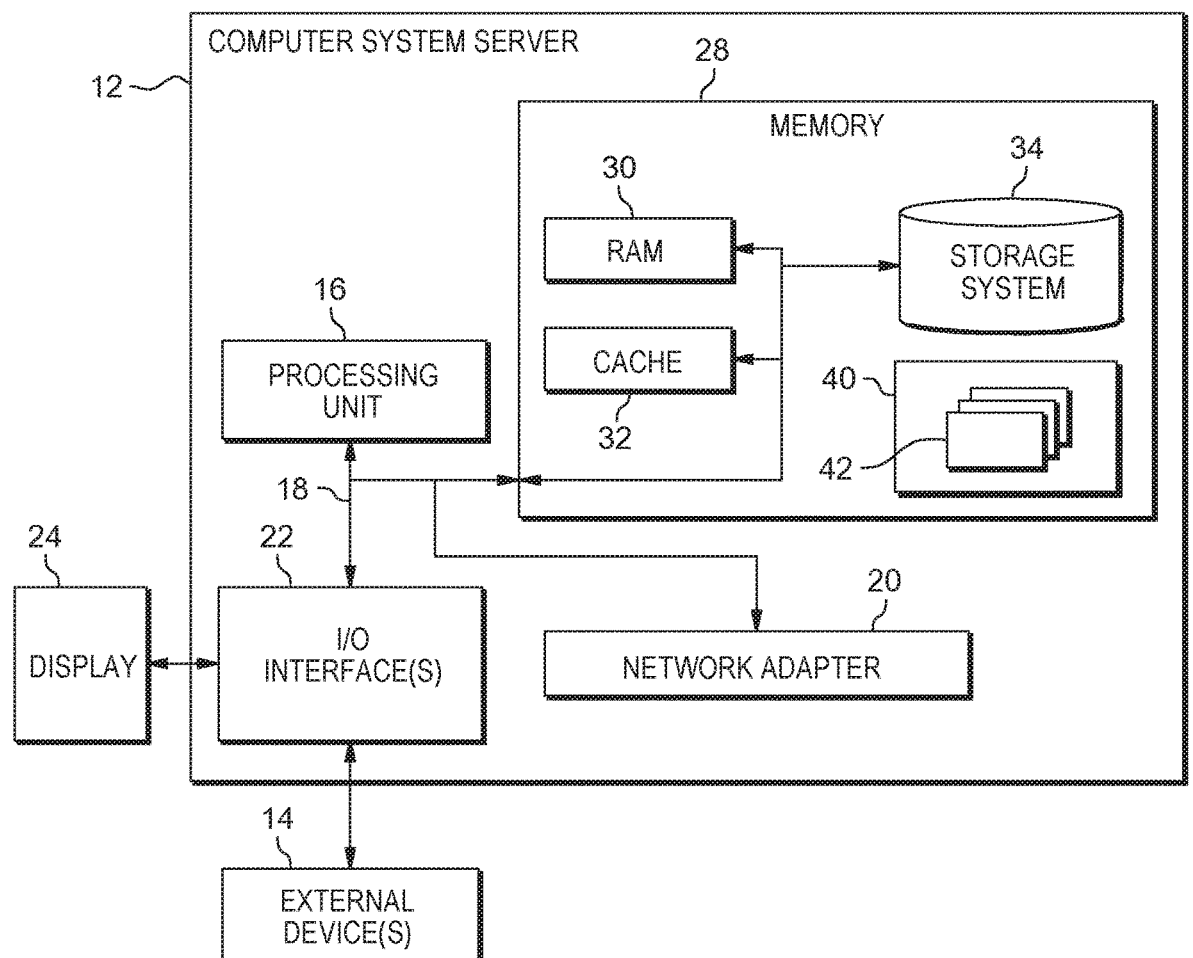
FIG. 1 shows an exemplary computer system which is applicable to implement the embodiments of the present invention.

Referring now to FIG. 1, in which an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor(s) 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
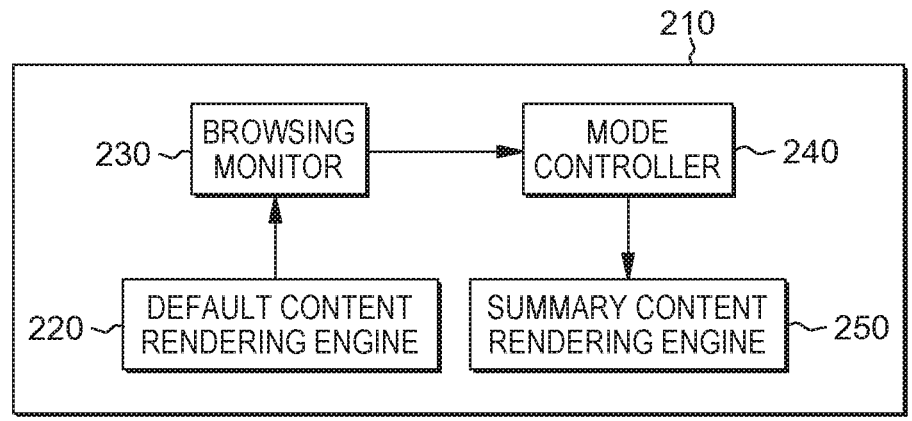
FIG. 2 depicts a block diagram illustrating a data processing environment, according to embodiments of the present invention.

Referring now to FIG. 2, a data processing environment, generally designated 200, is illustrated in accordance with an embodiment of the present invention. Data processing environment 200 includes computing device 210, which may include internal and external components as depicted and described with reference to FIG. 1. Computing device 210 includes default content rendering engine 220, browsing monitor 230, mode controller 240, and summary content rendering engine 250. In various embodiments of the present invention, computing device 210 can be a standalone computing device, a management server, a web server, a mobile computing device, or any other electronic device or computing system capable of receiving, sending, and processing data. In other embodiments, computing device 210 can represent a server computing system utilizing multiple computers as a server system. In another embodiment, server computing device can be a laptop computer, a tablet computer, a netbook computer, a personal computer, a desktop computer, or any programmable electronic device capable of communicating with other computing devices (not shown) within data processing environment 200 via a network, for example, a telecommunications network, a local area network, a wide area network, such as the Internet, or a combination of the three, and can include wired, wireless, or fiber optic connections.

In another embodiment, computing device 210 represents a computing system utilizing clustered computers and components (e.g., database server computers, application server computers, etc.) that act as a single pool of seamless resources when accessed within data processing environment 200. In various embodiments, each of the programs, modules, and/or database included on computing device 210 may be located elsewhere within data processing environment 200 with access to data and information for implementation of the present invention via a network.

In an exemplary embodiment of the present invention, computing device 210 includes a social network application (not shown). The social network application is a platform available via a network to build social networks or social relations among people who share interests, activities, backgrounds, or real-life connections. Content is provided on a social network application by other users of the application, and can appear in a display format where most recent items appear first, and earlier items appear below, where a user can scroll from most recent to earlier items using a scrolling operation, such as a finger touch or a mouse wheel. Content may be displayed on a user interface, or other display such as display 24 as discussed with reference to FIG. 1. In embodiments, default content rendering engine 220 operates to render content of the social network application for display on computing device 210 for viewing by a user of computing device 210. The default content display may be as depicted and described with reference to FIG. 4. Browsing monitor 230 monitors the speed at which a user is scrolling through the content rendered and displayed on computing device 210. If the scrolling speed exceeds a maximum threshold value, then browsing monitor 230 provides a signal to mode controller 240. Mode controller 240 then switches the display mode to summary mode, and signals summary content rendering engine 250 to provide content for display on computing device 210 in summary mode, which is depicted and described with reference to FIG. 5.

Mode controller 240 signals browsing monitor 230 that the current display mode is summary mode. Browsing monitor 230 then monitors the scrolling speed at which a user is scrolling the display of computing device 210. If the scrolling speed falls below a threshold minimum speed, browsing monitor 230 signals mode controller 240 such information, and mode controller 240 switches to default mode, and signals default content rendering engine 220 to provide content for display on computing device 210 in default mode.

An advantage of embodiments of the present invention is to provide a solution of dynamically adjusting information items of an application displayed to user. The adjustment is based on the scrolling speed of a screen associated with the scrolling operation by a user when browsing updated information items of the application.

Figure 4:
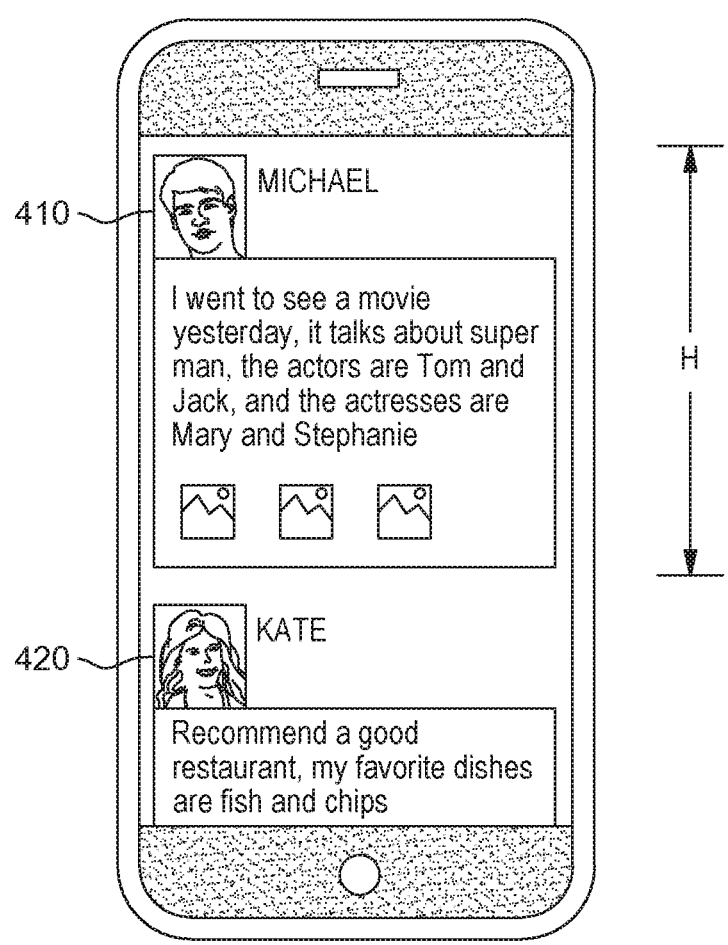
FIG. 4 depicts an example of a screen shot of a mobile device in which a plurality of information items are displayed, according to an embodiment of the present invention.

In one embodiment of the present invention, the application can be a social network application. In various embodiments, in a social network application, a plurality of information items are displayed in sequence. FIG. 4 shows an example of a screen shot of a mobile device in which a plurality of information items (410, 420) are displayed. For example, as shown in the FIG. 4, an information item 410 (the one from Michael) may contain a profile photo, a name of message sender, a text message and one or more pictures.

Though it is not displayed in the FIG. 4, the information item may also contain links, audio, video and other media. In the FIG. 4, one information item 410 is sent from Michael and contains a text message of "I went to see a movie yesterday, it talks about superman, the actors are Tom and Jack, and the actresses are Mary and Stephanie" and three pictures, and the other information item 420 is sent from Kate and contains only a text message of "Recommend a good restaurant, my favorite dishes are fish and chips". If someone scrolls up the screen, the information item 410 from Michael will move up and leave the screen from the top, the information item 420 from Kate will move up and the next information below Kate will come up from the bottom.

Figure 3:
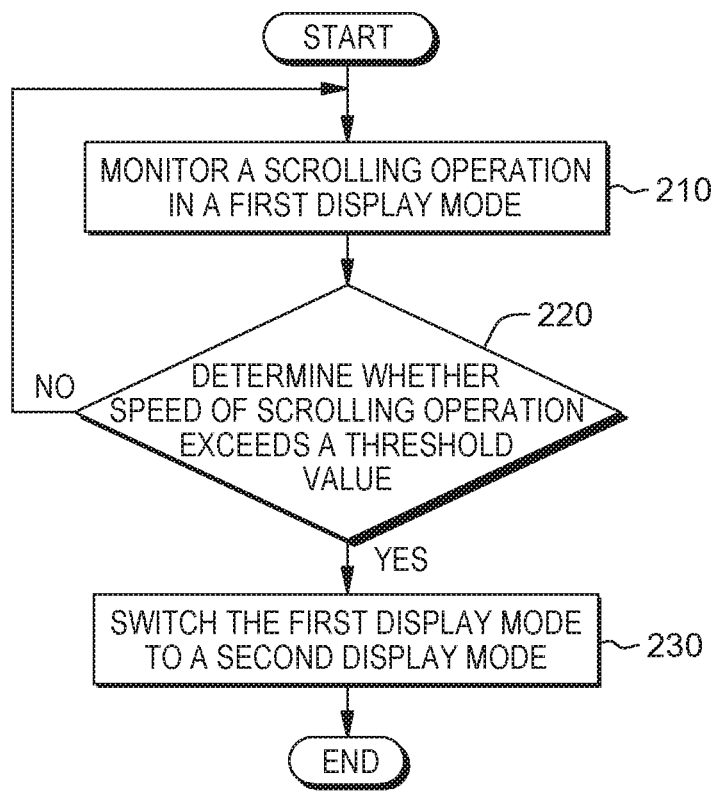
FIG. 3 is a flowchart illustrating a method for quick browsing according to an embodiment of the present invention.

With reference now to FIG. 3, FIG. 3 is a flowchart illustrating a computer-implemented method for quick browsing according to an embodiment of the present invention. As shown in FIG. 3, the computer-implemented method for quick browsing includes a monitoring step 310, a determining step 320, and a mode switching step 330. Hereinafter, respective steps of the method for quick browsing in the FIG. 3 are explained in detail.

In the monitoring step 310, a scrolling operation is monitored in a first display mode in which a plurality of original information items are displayed. For example, the first display mode (the detail display mode, or default mode) is the display mode shown in the FIG. 4. That is to say, the first display mode is a normal display mode like those of the social network application in the prior art. In the following, for the purpose of simplicity and clarity of explanation, we will take FIG. 4 as an example to explain this disclosure. FIG. 4 shows a mobile device with a touch screen, however, an aspect of the invention is also applicable to a computer with a mouse, such as a desktop or a laptop. That is, the scrolling operation may be one of a sliding touch on a touch screen, a mouse wheel scrolling and scrolling of a scroll bar. Additionally, FIG. 4 shows that the information items are displayed in sequence vertically and the scrolling direction of the scrolling operation is the vertical direction of the screen, however, an aspect of the invention is also applicable to the case in which the information items are displayed in sequence horizontally and the scrolling direction of the scrolling operation is the horizontal direction of the screen.

In the monitoring step 310, specifically, the monitored target is the scrolling speed associated with the scrolling operation. In one embodiment, the scrolling speed of the screen is proportional to the speed of the scrolling operation, such as the sliding speed of a finger on the screen, the scrolling speed of a mouse wheel and scrolling speed of scrolling operation on a scroll bar.

In the determining step 320, the speed of the scrolling operation is determined and it is determined whether the speed exceeds a threshold value, $V_{th}$. In various embodiments, the speed of the scrolling operation is determined using known methods based on, for example, the speed of an operation on the screen of computing device 210, such as the sliding speed of a finger. The threshold speed value may be a maximum speed, $V_{max}$, or a minimum speed, $V_{min}$. For example, if browsing monitor 230 determines the scrolling speed exceeds $V_{max}$, then mode controller 240 may determine to switch the display mode from default, or detail, mode to summary mode. If browsing monitor 230 determines the scrolling speed does not exceed $V_{min}$, then mode controller 240 may determine to switch the display mode from summary mode to default, or detail mode.

In the mode switching step 330, in response to the scrolling speed associated with the scrolling operation exceeding a threshold, the first display mode is switched to a second display mode in which the information items are more recognizable as compared to the first display mode. When an item is more recognizable to a user while scrolling, the ability of the user to view and/or absorb the content of the information item displayed on a screen increases, such as content posted in a social network application. The more recognizable an information item, the more likely a user is to view the information item. For example, when quickly scrolling through content in a social network application, a user's ability to recognize information items is low. However, embodiments of the present invention provide the user, when the user is quickly scrolling through content, the ability to view summaries of the information items, or larger font size of the information items, providing the user with the ability to recognize the content.

In one embodiment of the present invention, the method in the FIG. 3 further comprises: in response to the scrolling speed associated with the scrolling operation falling below the threshold, $V_{th}$ or $V_{min}$, switching the second display mode back to the first display mode. When a user slows down the scrolling speed, this implies the user has interest with current displayed information items, the user may want to see more details. Then the summary display mode (the second display mode) can be switched back to the detail display mode (the first display mode). In the first display mode, the details of each information items are expanded and fully displayed.

There are several ways to make the information items in a social network application easier to be recognized by an user. In one embodiment of the present invention, in the second display mode, at least one of the original information items is collapsed as a summary information item with a length of characters less than a length of characters displayed in the first display mode in the scrolling direction of the scrolling operation. The characters in an information item may be text, photograph, web link, etc.

When a user scrolls the screen at a high speed, this implies the user has less interest in current displayed information items. However, important information items such as important friends' updates or important news from his/her most concerned areas might be missed while quickly browsing due to the reduction of recognition capability of human eyes to fast moving objects. An aspect of the invention provides a way to improve the recognizability for information items in fast scrolling without influencing the scrolling operation. In one embodiment of the present invention, it is judged in the mode switching step 330 that if the scrolling speed associated with the scrolling operation exceeds a threshold Vth. If the monitored scrolling speed of the scrolling operation exceeds the threshold Vth, the first display mode is switched to the second display mode, which is a summary display mode in which information amount in the information item will be reduced, and an original information item will collapse as a summary information item with a length less than its length displayed in the first display mode in the scrolling direction of the scrolling operation. In one embodiment of the present invention, not all of the original information items will be collapsed as summary information items, and only information items having information amount above a predetermined threshold will be collapsed. In the case where information items are displayed in sequence vertically, a summary information item will have a height less than that of its original information item. In the case where information items are displayed in sequence horizontally, a summary information item will have a width less than that of its original information item.

Regarding the threshold Vth, it can be a speed value that if the scrolling speed exceeds it, human eyes cannot identify information in information items any longer. Of course, the threshold Vth may be set to other appropriate values.

Figure 5:
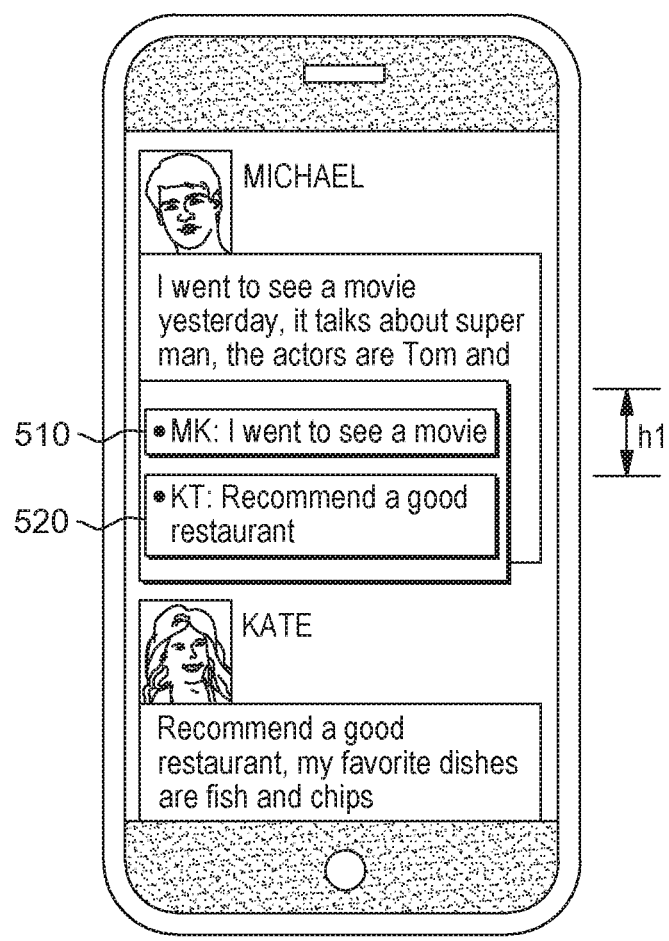
FIG. 5 shows an example of a summary information display mode in which summary information items are displayed, according to an embodiment of the present invention.

In one embodiment of the present invention, in the second display mode, the summary information items are displayed in a floating window and the original information items are still displayed under the floating window. FIG. 5 shows an example of a summary information display mode in which one or more summary information items (510, 520) are displayed in a floating window. For example, the original information item 410 sent from "Michael" on the screen of the FIG. 4 has a height of H. However, in the FIG. 5, this original information item 410 collapses to a summary information item 510 in which only a nick name "MK" and a summary text "I went to see a movie" are displayed. Thus, this summary information item 510 has a height of h1, and h1 is smaller than H. In the FIG. 5, the floating window is smaller than the main window that displays original information items. In one embodiment of the present invention, while displaying summary information items in the floating window, the original information items are still displayed under the floating window in the main window. In one embodiment of the present invention, as shown in the FIG. 5, the original information items are displayed in a less conspicuous way, such as in a dark or vague way so that the summary information items in the floating window are easy to read. In another embodiment of the present invention, the original information items can be displayed normally in the main window. In the FIG. 5, if someone scrolls up the screen, the summary information item 510 "MK: I went to see a movie" will move up and leave the floating window from the top of the floating window, and the summary information item 520 "KT: Recommend a good restaurant" will move up and the next information below will come up from the bottom of the floating window.

Figure 6:
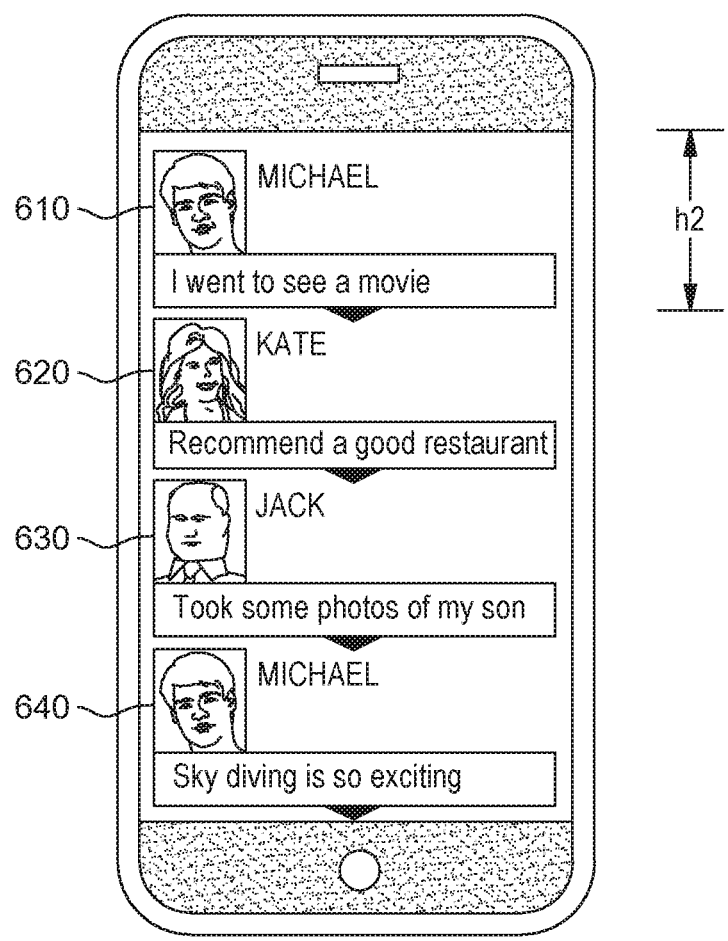
FIG. 6 shows an example of a summary information display mode in which summary information items are displayed in place of the original information items, according to an alternate embodiment of the present invention.

In one embodiment of the present invention, in the second display mode, the summary information items are displayed in place of the original information items. FIG. 6 shows an example of a summary information display mode in which one or more summary information items (610, 620, 630, 640) are displayed in place of the original information items. That is, only summary information items are displayed in the main window and the original information items are not displayed. For example, the original information item 410 sent from "Michael" on the screen of the FIG. 4 has a height of H. However, in the FIG. 6, this original information item 410 collapses to a summary information item 610 in which only a profile photo, a name "Michael" and a summary text "I went to see a movie" are displayed. Thus, this summary information item 610 has a height of h2, and h2 is smaller than H. This allows the user to see a higher number of information items within one screen. For example, four information items including additional two information items not appearing in the FIG. 4 (630, 640) are displayed in the screen of FIG. 6.

In one embodiment of the present invention, in the second display mode, the summary information item stays being displayed the same time duration as its corresponding original information item stays being displayed in the first display mode, until being scrolled out of display. Taking the case in FIG. 5 as an example to explain, both of the original information item 410 in the main window and the summary information item 510 in the floating window will move up while the scrolling operation is going on. Assuming the original information item 410 will stay being displayed in the main window for time t, the summary information item 510 will also stay being displayed in the floating window for time t. However, since the height H of the original information item 410 is larger than the height h1 of the summary information item 510, we have the following relationship:

$$\frac{H}{v1} = t = \frac{h1}{v2}$$

wherein v1 is the scrolling speed in the first display mode, and v2 is the scrolling speed in the second display mode. Since H>h1, we can derive that v2<v1. That is, in the second display mode (the summary display mode), the scrolling speed is slowed down. In one example, if H=100 (for example, in unit of pixels), and h1=20, we can derive that, v2=(20/100)*v1. In this case, the scrolling speed is slowed down by 5 times, so it is very helpful for the human eyes to recognize the content in the information item that is scrolling fast. At the same time, it will not cause any feeling of lagging for the scrolling operation since the same time t is taken for displaying a same information item in the two display modes.

In another embodiment of the present invention, in the mode switching step 330, in response to the scrolling speed associated with the scrolling operation exceeding a threshold, the first display mode is switched to a second display mode in which the information items are displayed with a bigger font size than that in the first display mode. In this embodiment, the height and the scrolling speed of an information item are kept the same in the first display mode and in the second display mode. However, for the information items with a bigger font size in the second display mode, they may be more recognizable even if they are in fast scrolling. Of course, this embodiment can be combined with the above embodiment in which heights of information items are reduced. In another embodiment, the font size of summary information items may be increased to be bigger than the font size of the original information items.

In one embodiment of the present invention, each of the summary information items is generated based on its corresponding original information item so as to obtain a reduced length of the item in the scrolling direction. For example, the profile photo and/or attached pictures may be removed from the original information item to form a summary information item; the name may be replaced by a short nick name; the text message may be truncated; or key words may be extracted from the text message in the original information item to form a summary information item. These are only examples, and those skilled in the art can easily think of other ways to form a summary information item as long as it has a height (or width in the case of horizontal scrolling) smaller than that of the original information item.

In the above description, the social network application is used as an example to explain aspects of the present invention. However, in addition to the social network application, the present invention is also applicable to other application. In one embodiment, the present invention is applicable to a browser. In this case, for example, original information items are elements displayed in a web page, such as a picture, an article, a forum post, and etc. When switching to the second display mode due to a fast scrolling operation, these information items can be collapsed to have a shorter length, or be rendered with a bigger font size, or subject to both of the processes, to become more recognizable, as described above. Similarly, the present invention is applicable to a book reader. In this case, for example, original information items are chapters, paragraphs, or sections of a book. When switching to the second display mode due to a fast scrolling operation, these information items can be collapsed to have a shorter length, or be rendered with a bigger font size, or subject to both of the processes, to become more recognizable, as described above. Besides these examples, the present invention is applicable to other applications in which a fast scrolling operation may cause a poor recognition.

With the above embodiments of the invention, the recognition capability of human eyes for information items in fast scrolling is improved without influencing the scrolling operation.

The present invention may be a system, a method, and/or a computer program product. The computer program product may include a computer readable storage medium (or media) having computer readable program instructions thereon for causing a processor to carry out aspects of the present invention.

In an embodiment of the present invention, there is provided a system for quick browsing. The system comprises one or more processors and a memory coupled to at least one of the processors. The system further comprises a set of computer program instructions stored in the memory and executed by at least one of the processors in order to perform an action of monitoring a scrolling operation in a first display mode in which a plurality of original information items are displayed. The system further comprises a set of computer program instructions stored in the memory and executed by at least one of the processors in order to perform an action of in response to the scrolling speed associated with the scrolling operation exceeding a threshold, switching the first display mode to a second display mode in which the information items are more recognizable as compared to the first display mode.

In one embodiment of the system, in the second display mode, at least one of the original information items is collapsed as a summary information item with a length less than its length displayed in the first display mode in the scrolling direction of the scrolling operation.

In one embodiment of the system, in the second display mode, the information items are displayed with a bigger font size than that in the first display mode.

In one embodiment of the system, the set of computer program instructions being stored in the memory and executed by at least one of the processors in order to perform an action of: in response to the scrolling speed associated with the scrolling operation falling below the threshold, switching the second display mode back to the first display mode.

In one embodiment of the system, in the second display mode the summary information items are displayed in a floating window and the original information items are still displayed under the floating window.

In one embodiment of the system, in the second display mode the summary information items are displayed in place of the original information items.

In one embodiment of the system, in the second display mode the summary information item stays being displayed the same time duration as its corresponding original information item stays being displayed in the first display mode, until being scrolled out of display.

In one embodiment of the system, each of the summary information items is generated based on its corresponding original information item so as to obtain a reduced length of the item in the scrolling direction.

In one embodiment of the system, the scrolling direction is one of vertical direction and horizontal direction of a screen, and the scrolling operation is one of a sliding touch on the screen, a mouse wheel scrolling and scrolling of a scroll bar.

In an embodiment of the present invention, there is provided a computer program product for quick browsing. The computer program product comprises a computer readable storage medium having program instructions embodied therewith. The program instructions being executable by a device to perform a method. The method comprises monitoring a scrolling operation in a first display mode in which a plurality of original information items is displayed. The method further comprises in response to the scrolling speed associated with the scrolling operation exceeding a threshold, switching the first display mode to a second display mode in which the information items are more recognizable as compared to the first display mode.

In one embodiment of the computer program product, in the second display mode, at least one of the original information items is collapsed as a summary information item with a length less than its length displayed in the first display mode in the scrolling direction of the scrolling operation.

In one embodiment of the computer program product, in the second display mode, the information items are displayed with a bigger font size than that in the first display mode.

In one embodiment of the computer program product, the method further comprises: in response to the scrolling speed associated with the scrolling operation falling below the threshold, switching the second display mode back to the first display mode.

In one embodiment of the computer program product, in the second display mode, the summary information items are displayed in a floating window and the original information items are still displayed under the floating window.

In one embodiment of the computer program product, in the second display mode, the summary information items are displayed in place of the original information items.

In one embodiment of the computer program product, in the second display mode the summary information item stays being displayed the same time duration as its corresponding original information item stays being displayed in the first display mode, until being scrolled out of display.

In one embodiment of the computer program product, each of the summary information items is generated based on its corresponding original information item so as to obtain a reduced length of the item in the scrolling direction.

In one embodiment of the computer program product, the scrolling direction is one of vertical direction and horizontal direction of a screen, and the scrolling operation is one of a sliding touch on the screen, a mouse wheel scrolling and scrolling of a scroll bar.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for quick browsing of content displayed on a computing device, comprising:
    displaying, by the computing device, a first set of ordered information items from a list of ordered information items in a main window, wherein display of the first set of ordered information items is via a first display mode;
    monitoring, by the computing device, a scrolling speed of a scrolling operation on the computing device, wherein the scrolling operation is performed within the main window of the first display mode;
    determining, by the computing device, between the first display mode and a second display mode, based on the scrolling speed of the scrolling operation exceeding a scrolling speed threshold; and
    in response to the scrolling speed of the scrolling operation exceeding the scrolling speed threshold, displaying, by the computing device, the second display mode, wherein the second display mode displays the first set of ordered information items in the main window under a second set of ordered information items within a floating window, wherein the second set of ordered information items comprises at least one summary information item generated based on collapsing at least one corresponding information item from the first set of ordered information items so as to obtain a reduced length of the at least one corresponding information item, and wherein the at least one summary information item stays being displayed within the floating window for a same time duration as the at least one corresponding information item stays being displayed in the main window until being scrolled out of display.

2. The computer-implemented method according to claim 1, wherein displaying, by the computing device, the second display mode further comprises:
    collapsing in the second display mode at least one information item of the second set of ordered information items as one or more summary information items with a length of characters less than a length of characters displayed in the first display mode.

3. The computer-implemented method according to claim 1, further comprising:
    in response to the speed of the scrolling operation falling below the threshold value, switching the second display mode back to the first display mode.

4. The computer-implemented method according to claim 1, further comprising:
    adapting a speed of a scrolling operation performed within the floating window of the second display mode to match the speed of the monitored scrolling operation performed within the main window of the first display mode, wherein the speed of the scrolling operation performed within the floating window is slowed down.

5. The computer-implemented method according to claim 1, wherein a direction of the scrolling operation is one of a vertical direction and a horizontal direction of a screen, and the scrolling operation is one of a sliding touch on the screen, a mouse wheel scrolling, and scrolling of a scroll bar.

6. A computer system for quick browsing of content displayed on a computing device, comprising:
    one or more computer processors; and
    a memory coupled to at least one of the one or more computer processors;
    a set of computer program instructions stored in the memory and executed by at least one of the one or more computer processors in order to perform actions of:
    program instructions to display a first set of ordered information items from a list of ordered information items in a main window, wherein display of the first set of ordered information items is via a first display mode;
    program instruction to monitor a scrolling speed of a scrolling operation on the computing device, wherein the scrolling operation is performed within the main window of the first display mode;
    program instruction to determine between the first display mode and a second display mode based on the scrolling speed of the scrolling operation exceeding a scrolling threshold; and
    in response to the scrolling speed of the scrolling operation exceeding the scrolling threshold, program instructions to display the second display mode, wherein the second display mode displays the first set of ordered information items in the main window under a second set of ordered information items within a floating window, wherein the second set of ordered information items comprises at least one summary information item generated based on collapsing at least one corresponding information item from the first set of ordered information items so as to obtain a reduced length of the at least one corresponding information item, and wherein the at least one summary information item stays being displayed within the floating window for a same time duration as the at least one corresponding information item stays being displayed in the main window until being scrolled out of display.

7. The computer system according to claim 6, wherein the program instructions to display the second display mode further comprises:
program instructions to collapse in the second display mode at least one information item of the second set of ordered information items as one or more summary information items with a length of characters less than a length of characters displayed in the first display mode.

8. The computer system according to claim 6, wherein the set of computer program instructions being stored in the memory and executed by at least one of the processors in order to perform an action of:
in response to the speed of the scrolling operation falling below the threshold value, switching the second display mode back to the first display mode.

9. The computer system according to claim 6, further comprising:
adapting a speed of a scrolling operation performed within the floating window of the second display mode to match the speed of the monitored scrolling operation performed within the main window of the first display mode, wherein the speed of the scrolling operation performed within the floating window is slowed down.

10. The computer system according to claim 6, wherein a direction of the scrolling operation is one of a vertical direction and a horizontal direction of a screen, and the scrolling operation is one of a sliding touch on the screen, a mouse wheel scrolling, and scrolling of a scroll bar.

11. A computer program product for quick browsing of content displayed on a computing device, the computer program product comprising a computer readable storage medium having program instructions stored thereon, wherein the program instructions being executable by the computing device to perform a method comprising:
program instructions to display a first set of ordered information items from a list of ordered information items in a main window, wherein display of the first set of ordered information items is via a first display mode;
program instruction to monitor a scrolling speed of a scrolling operation on the computing device, wherein the scrolling operation is performed within the main window of the first display mode;
program instruction to determine between the first display mode and a second display mode based on the scrolling speed of the scrolling operation exceeding a scrolling threshold; and
in response to the scrolling speed of the scrolling operation exceeding the scrolling threshold, program instructions to display the second display mode, wherein the second display mode displays the first set of ordered information items in the main window under a second set of ordered information items within a floating window, wherein the second set of ordered information items comprises at least one summary information item generated based on collapsing at least one corresponding information item from the first set of ordered information items so as to obtain a reduced length of the at least one corresponding information item, and wherein the at least one summary information item stays being displayed within the floating window for a same time duration as the at least one corresponding information item stays being displayed in the main window until being scrolled out of display.

12. The computer program product according to claim 11, wherein the program instructions to display the second display mode further comprises:
program instructions to collapse in the second display mode at least one information item of the second set of ordered information items as one or more summary information items with a length of characters less than a length of characters displayed in the first display mode.

13. The computer program product according to claim 11, wherein the program instructions being further executable by the computing device to perform a method further comprising:
in response to the speed of the scrolling operation falling below the threshold value, switching the second display mode back to the first display mode.

14. The computer program product according to claim 11, further comprising:
adapting a speed of a scrolling operation performed within the floating window of the second display mode to match the speed of the monitored scrolling operation performed within the main window of the first display mode, wherein the speed of the scrolling operation performed within the floating window is slowed down.

* * * * *